(12) United States Patent
Talbert et al.

(10) Patent No.: US 10,178,593 B2
(45) Date of Patent: Jan. 8, 2019

(54) SELF-ORGANIZING CUSTOMER PREMISES NETWORK

(71) Applicant: Verizon Patent and Licensing Inc., Arlington, VA (US)

(72) Inventors: Michael Talbert, Nazareth, PA (US); Meaghan Leong, Cohasset, MA (US); Christina Fyock, Sudbury, MA (US); Daniel J. O'Callaghan, Fairfax Station, VA (US); Edward J. Norris, Lancaster, MA (US); William E. Garrett, Jr., Framingham, MA (US); Roland W. Hicks, Jr., Annandale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/433,625

(22) Filed: Feb. 15, 2017

(65) Prior Publication Data

US 2018/0234902 A1    Aug. 16, 2018

(51) Int. Cl.

| | |
|---|---|
| *H04W 4/00* | (2018.01) |
| *H04W 36/14* | (2009.01) |
| *H04W 8/18* | (2009.01) |
| *H04W 36/32* | (2009.01) |
| *H04M 15/00* | (2006.01) |
| *H04W 84/12* | (2009.01) |
| *H04W 84/18* | (2009.01) |
| *H04W 88/08* | (2009.01) |

(52) U.S. Cl.
CPC .......... *H04W 36/14* (2013.01); *H04M 15/88* (2013.01); *H04W 8/18* (2013.01); *H04W 36/32* (2013.01); *H04W 84/12* (2013.01); *H04W 84/18* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2010/0299419 A1* | 11/2010 | Ramankutty | H04W 24/02 709/221 |
| 2012/0064908 A1* | 3/2012 | Fox | H04W 28/10 455/452.2 |
| 2012/0084364 A1* | 4/2012 | Sivavakeesar | H04L 12/1818 709/205 |
| 2013/0156016 A1* | 6/2013 | Debnath | H04W 72/0406 370/336 |
| 2013/0272121 A1* | 10/2013 | Stanwood | H04L 47/2475 370/230 |

(Continued)

*Primary Examiner* — Phirin Sam

(57) ABSTRACT

A computer device may include a memory configured to store instructions and a processor configured to execute the instructions to determine a service requirement for a client device connected to a WiFi access point in a customer premises network that includes a plurality of WiFi access points. The processor may be further configured to monitor a service requirement parameter, associated with the determined service requirement, for the client device; detect that the service requirement parameter is within a threshold of the determined service requirement; and perform a self-organizing network (SON) action on the customer premises network, in response to detecting that the service requirement parameter is within the threshold of the determined service requirement.

20 Claims, 12 Drawing Sheets

(56) References Cited

U.S. PATENT DOCUMENTS

| | | | |
|---|---|---|---|
| 2014/0269269 A1* | 9/2014 | Kovvali | H04W 24/08 370/229 |
| 2014/0293795 A1* | 10/2014 | Xiao | H04W 28/0215 370/236 |
| 2014/0315536 A1* | 10/2014 | Chow | H04W 8/18 455/419 |
| 2015/0098393 A1* | 4/2015 | Tofighbakhsh | H04W 24/02 370/329 |
| 2015/0103685 A1* | 4/2015 | Butchko | H04L 43/50 370/252 |
| 2015/0341358 A1* | 11/2015 | Borovikov | H04L 63/10 726/27 |
| 2016/0262160 A1* | 9/2016 | Mo | H04L 41/50 |
| 2017/0019750 A1* | 1/2017 | Palanisamy | H04W 28/0289 |
| 2017/0149609 A1* | 5/2017 | Tofighbakhsh | H04L 41/0816 |
| 2017/0251385 A1* | 8/2017 | Fox | H04L 41/5025 |

* cited by examiner

SELF-ORGANIZING CUSTOMER PREMISES NETWORK

BACKGROUND INFORMATION

In order to satisfy the needs and demands of users of mobile communication devices, providers of wireless communication services continue to improve and expand available services as well as networks used to deliver such services. One aspect of such improvements includes the interfacing of wireless access networks and devices in a customer premises location. A customer may have a large number of client devices in the customer premises location and different client devices may be associated with different requirements. In order to maintain a quality of service in a customer premises location, the provider may need to take into account various conditions that vary across networks and/or devices.

DETAILED DESCRIPTION OF PREFERRED EMBODIMENTS

Figure 1:
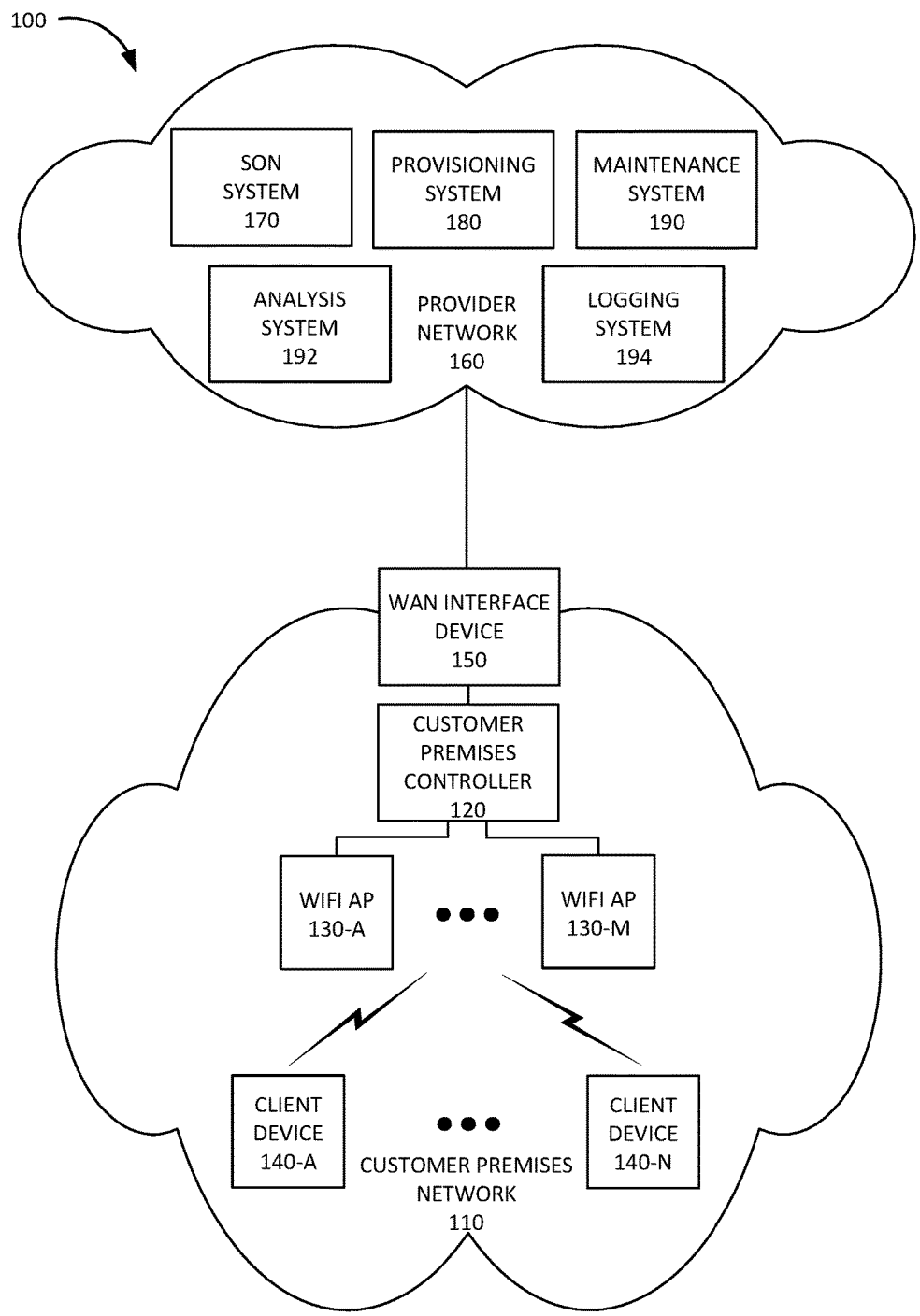
FIG. 1 is a diagram illustrating an environment according to an implementation described herein.

The following detailed description refers to the accompanying drawings. The same reference numbers in different drawings identify the same or similar elements.

Residences, business, and/or public spaces may include a Layer 2 and/or Layer 3 local area network (LAN) that enables devices to connect to the Internet or other large-scale networks, such as the Public Switched Telephone Network (PSTN). For example, a customer's residential home may be served by a router managed by a provider of communication services. The router may be connected to, or may also function as, a Wireless Fidelity (WiFi) access point (AP) that provides short-range wireless access for devices in the customer's home. Various devices in the customer's home, such as a laptop computer, a tablet computer device, a mobile phone, and/or a gaming console may connect to the Internet via the WiFi AP and the router. However, as the number of such devices increase, along with an increase in the size and density of homes and office space, a single WiFi AP per customer may not be sufficient to service all of the customer's devices.

Furthermore, as the data traffic and number of devices using wireless networks increase, the number of different types of devices and the number of different types of data also increase. As an example, an exponential growth in Internet of Things (IoT) applications leads to an increasing number of different types of devices employing machine-to-machine (M2M) communication, such as Machine-Type Communication (MTC), a type of M2M communication standard developed by the $3^{rd}$ Generation Partnership Project (3GPP). As another example, short-range wireless communication is increasingly being used for new types of applications, such as connected cars, connected public transport systems, and drones.

Self-organizing networks (SONs) have enabled automation of optimization functions for wireless networks and may be deployed at a scale to manage wireless networks, such as 4G and 5G wireless networks. SON functions may be used to enable discovery and optimization of base station neighbor lists, modification of antenna tilts or directions to improve coverage or capacity, changes to handoff parameters to reduce handover drops, and/or other types of parameters that previously required laborious procedures to be executed manually. Applying SON functions to WiFi networks may improve the functioning of WiFi networks, resulting in reduced network loads, improved coverage, and a better customer experience.

Implementations described herein relate to a self-organizing customer premises network. The customer premises network may include a customer premises controller that manages a set of WiFi APs distributed throughout a customer premises location to maximize coverage. The customer premises controller may be connected to the cloud (i.e., a provider network) via a Wide Area Network (WAN) interface device, which may include a wired or a wireless connection to the provider network. The customer premises controller may manage the set of WiFi APs and client devices and may perform SON functions to manage the operation of the customer premises network. The customer premises controller may communicate with a SON system in the provider network to perform one or more of the SON functions. For example, the customer premises controller may mirror stored data to the SON system and/or may report one or more SON parameters associated with the customer premises network, to the SON system.

The SON functions performed by the customer premises controller may include maintaining service requirements for client devices, provision WiFi APs, managing handoffs, load balancing traffic between WiFi APs, mitigating channel interference between WiFi APs, and/or monitoring the health of the customer premises network.

A provisioning process may include, for example, determining that an additional WiFi AP is to be provisioned for the customer premises network and alerting a provisioning system, in response to determining that the additional WiFi AP is to be provisioned for the customer premises network. A handoff process may include detecting that the client device has moved a particular distance from the customer premises network and handing off the client device from the customer premises network to a wireless access network, in response to detecting that the client device has moved the particular distance from the customer premises network. The handoff process may further include detecting that a client device, associated with the customer premises network, is attached to a wireless access network and has moved to within a particular distance of the customer premises network and handing off the client device from the wireless access network to the customer premises network, in response to detecting that the client device is attached to the wireless access network and has moved to within the particular distance of the customer premises network.

In maintaining service requirements for client devices, the customer premises controller may determine a service requirement for a client device connected to a WiFi AP in the customer premises network; monitor a service requirement parameter, associated with the determined service requirement, for the client device; detect that the service requirement parameter is within a threshold of the determined service requirement; and perform a SON action on the customer premises network, in response to detecting that the service requirement parameter is within the threshold of the determined service requirement. Furthermore, the customer premises controller may define and/or change a service requirement for a client device.

The service requirement may include, for example, a Quality of Service (QoS) class requirement, a throughput requirement, a minimum data rate requirement, a latency requirement, an airtime availability requirement, an application service requirement, a signal strength requirement, a band requirement, a response time requirement, and/or another type of service requirement.

In detecting that the service requirement parameter is within the threshold of the determined service requirement, the customer premises controller may generate a profile for the client device that includes historical usage information for the client device and may use the generated profile in predicting whether the service requirement parameter will reach the threshold of the determined service requirement within a particular time period.

SON action that is performed may include one or more of throttling a throughput of another client device connected via the customer premises network, moving another client device from a first WiFi AP to a second WiFi AP, moving the client device to another WiFi AP, moving the client device, or another client device, to a different band of a WiFi AP, moving one or more WiFi APs to a different channel, and/or mitigating channel interference between at least two of WiFi APs.

As an example, a load balancing process may include moving a client device from a first WiFi AP to a second WiFi AP in response to determining that the second WiFi AP has a higher available capacity than the first WiFi AP. As another example, a load balancing process may include moving one or more client devices from a first WiFi band to a second WiFi band. A load balancing process may further maintain a particular signal quality for client devices. For example, the customer services controller may detect that a signal strength associated with the client device is below a signal strength threshold and move the client device to another WiFi AP, in response to detecting that the signal strength associated with the client device is below the signal strength threshold. Moreover, a load balancing process may be performed in response to detecting a malfunction associated with a particular WiFi AP by, for example, moving one or more client devices connected to the particular WiFi AP to another WiFi AP.

A channel interference mitigation process may include, for example changing an active channel of a WiFi AP based on detecting that a neighboring WiFi AP associated with a neighboring WiFi AP is causing signal interference by reducing signal quality. A health monitoring process may include, for example, detecting a malfunction associated with a WiFi AP and alerting a maintenance system, in response to detecting the malfunction.

FIG. 1 is a diagram of an exemplary environment 100 in which systems and/or methods, described herein, may be implemented. As shown in FIG. 1, environment 100 may include a customer premises network 110, a Wide Area Network (WAN) interface device 150, and a provider network 160.

Customer premises network 110 may include a Layer 2 and/or Layer 3 local area network (LAN) associated with a customer's premises. For example, customer premises network 110 may reside in a residential home, in an apartment building, in a school, in a commercial office building, in a shopping mall, in a connected mass transit vehicle (e.g., bus, train, plane, boat, etc.), and/or in another type of location associated with a customer of a provider of telecommunication services. Customer premises network 110 may receive one or more services via the connection between WAN interface device 150 and provider network 160, such as, for example, a television service, Internet service, and/or voice communication (e.g., telephone) service. Customer premises network 110 may be implemented as a gigabit network that enables gigabit speed connections. Customer premises network 110 may include a customer premises controller 120, WiFi APs 130-A to 130-M (referred to herein collectively as "WiFi APs 130" and individually as "WiFi AP 130"), and client devices 140-A to 140-M (referred to herein collectively as "client devices 140" and individually as "client device 140").

Customer premises controller 120 may include a network device configured to function as a switch and/or router for devices in customer premises network 110 and may connect devices in customer premises network 110 to a WAN, such as provider network 160, via WAN interface device 150. Customer premises controller 110 may include a layer 2 and/or layer 3 network device, such as a switch, router, firewall, and/or gateway and may support different types of interfaces, such as an Ethernet interface, a WiFi interface, a Multimedia over Coaxial Alliance (MoCa) interface, and/or other types of interfaces. Customer premises controller 110 may manage WiFi APs 130 and may perform SON functions for WiFi APs 130 and client devices 140 connected to WiFi APs 130.

WiFi AP 130 may include a device with a transceiver configured to communicate with client devices 140 using WiFi signals based on the Institute of Electrical and Electronics Engineers (IEEE) 802.11 standards for implementing a wireless LAN network. WiFi AP 130 may enable client devices 140 to communicate with each other and/or with WAN interface device 150 via customer premises controller 120. WiFi AP 130 may be connected to customer premises controller 120 via a wire connection (e.g., an Ethernet cable). Furthermore, WiFi APs 130 may include one or more Ethernet ports for connecting client devices 140 via a wired Ethernet connection.

WiFi APs 130 may be distributed throughout the customer premises location to provide coverage to all areas of the customer premises location. For example, a WiFi AP 130 may lose 8-10 decibels (dB) of signal strength for each wall, ceiling or floor through which the wireless signals pass. Therefore, WiFi APs 130 may be located in different rooms of the customer premises location (e.g., different bedrooms, different offices, different apartments of an apartment building, etc.). In such distributed configurations, WiFi APs 130 may also be referred to as "WiFi sprinkler heads."

Management of WiFi APs 130 may be performed over secure protocols, such as Transport Layer Security (TLS) protocol or Secure Shell (SSH) protocol and exchange of wireless frames may be protected via the 802.11w standard. WiFi AP 130 may have a unique 2048-bit x.509 certificate and a 2048-bit x.509 root certificate, which may be provided by, for example, SON system 170 or by a technician installing WiFi APs 130 in the customer premises location. Wired management or control connections between WiFi APs 130 and customer premises controller 130 may be required to mutually authenticate each other. Furthermore, communication with customer premises network 110 may be encrypted using, for example, Advanced Encryption Standard (AES) with a long key length (e.g., 128-bit key length).

Client device 140 may include any computer device that connects to a particular WiFi AP 130 using WiFi wireless signals. For example, client device 140 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a desktop computer; a set-top box or a digital media player (e.g., Apple TV, Google Chromecast, Amazon Fire TV, etc.); a smart television; a portable gaming system; a home appliance device; a home monitoring device; and/or any other type of computer device with wireless communication capabilities. Client device 140 may be used for voice communication, mobile broadband services (e.g., video streaming, real-time gaming, premium Internet access etc.), best effort data traffic, and/or other types of applications.

As another example, client device 140 may correspond to an embedded wireless device that communicates wirelessly with other devices over an M2M interface using MTC and/or another type of M2M communication. As an example, client device 140 may be electrically connected or coupled to a sensor device, an actuator device, a microcontroller controlling one or more sensors, a microcontroller controlling one or more actuators, a microcontroller that performs data processing, and/or another type of MTC device. Examples of such devices may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

As yet another example, client device 140 may correspond to an unmanned aerial vehicle or an unmanned aircraft system that communicates wirelessly with other devices over an M2M interface using MTC and/or another type of M2M communication. For example, a delivery drone may arrive at a customer premises location while connected to a base station and may be handed off to customer premises network 110 to be guided into a landing location to drop off a delivery payload.

WAN interface device 150 may interface customer premises network 110 to provider network 160 via a wireless connection and/or via a wired connection. A connection between WAN interface device 150 and provider network 160 may be established using a mutually authenticated TLS session. As an example, WAN interface device 150 may include an optical network terminal (ONT). An ONT may connect to provider network 160 via an optical fiber and may function as a gateway device to Gigabit Passive Optical Network (GPON) or a GPON2 located in provider network 160. As another example, WAN interface device 150 may connect to provider network 160 via a wired electrical connection, such as a coaxial cable.

As yet another example, WAN interface device 150 may include a wireless transceiver configured to communicate with provider network 160 via a wireless access network (not shown in FIG. 1) using cellular wireless signals. The wireless access network may establish a packet data network connection (e.g., an Internet Protocol (IP) connection) between WAN interface device 150 and provider network 160. In some implementations, the wireless access network may include a Long Term Evolution (LTE) access network (e.g., an evolved packet core (EPC) network) based on the LTE standard specified by the $3^{rd}$ Generation Partnership Project (3GPP). In other implementations, wireless access network may include an LTE Advanced (LTE-A) access network and/or a 5G access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CoMP); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. In yet other implementations, wireless access network may include a Code Division Multiple Access (CDMA) access network based on, for example, a CDMA1000 standard. For example, the CDMA access network may include a CDMA enhanced High Rate Packet Data (eHRPD) network (which may provide access to an LTE access network).

The wireless access network may include one or more base stations and WAN interface device 150 may connect to the wireless access network via one or more of the base stations. In other words, WAN interface device 150 may be located within the geographic area serviced by the base station. The base station may be part of an LTE eNodeB base station device and/or another LTE-A or 5G base station device. An eNodeB base station device may use the Evolved Universal Terrestrial Radio Access (E-UTRA) air interface or other air interfaces to wirelessly communicate with WAN interface device 150. The eNodeB base station device may include or be associated with one or more cells. For example, each cell may include an RF transceiver facing a particular direction. The eNodeB base station device may correspond to a macrocell or to a small cell (e.g., a femtocell, a picocell, a microcell, etc.).

In some implementations, WAN interface device 150 may be connected to customer premises controller 120 via a wired connection. In other implementations, WAN interface device 150 may be connected to customer premises controller 120 via a wireless connection, such as via a Broadband Near-Field Communication (BNC) transceiver configured to send and receive signals through an exterior wall. For example, WAN interface device 150 may be mounted on the outside wall of a building and customer premises controller 120 may be mounted on the inside of the wall in a position aligned with the WAN interface device 150 on the outside.

Provider network 160 may be managed, at least in part, by a provider of communication services that manages WAN interface device 150 and/or customer premises network 120. Provider network 160 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Provider network 160 may allow the delivery of Internet Protocol (IP) services to client devices 140, and may interface with other external networks. In some implementations, provider network 160 may include an Internet Protocol Multimedia Subsystem (IMS) network (not shown in FIG. 1). An IMS network may include a network for delivering IP multimedia services as specified by 3GPP or other standards/protocols and may provide media flows between client devices 140 and external IP networks or external circuit-switched networks (not shown in FIG. 1). Provider network 160 may include one or more server devices and/or network devices, or other types of computation or communication devices to manage the functionality of provider network 160 and/or customer premises network 110. For example, provider network 160 may include a self-optimizing network (SON) system 170, a provisioning system 180, a maintenance system 190, an analysis system 192, and a logging system 194.

SON system 170 may include one or more devices, such as computer devices and/or server devices, which perform self-optimization functions for provider network 160 and/or customer premises network 110. As an example, customer premises controller 120 may perform SON functions for customer premises network 110 and may mirror or back-up SON function data for customer premises network 110 to SON system 170. As another example, customer premises controller 120 may use SON system 170 for cloud computing in performing SON functions for customer premises network 110. As yet another example, SON system 170 may coordinate with customer premises controller 120 and/or WAN interface device 150 to perform SON optimization functions relating to the connection between customer premises controller 120 and provider network 160 such as, for example, performing optimization functions for a wireless access network to which WAN interface device 150 is connected. As yet another example, SON system 170 may coordinate SON functions between different customer premises networks 110, such as by mitigating WiFi channel interference between neighboring customer premises networks 110.

Provisioning system 180 may include one or more devices, such as computer devices and/or server devices, which provision customer services network 110. For example, provisioning system 180 may receive a message from customer premises controller 120 that customer services network 110 needs an additional WiFi AP 130 due to insufficient coverage and may provision an additional WiFi AP 130 to customer premises network 110. Provisioning system 180 may send an indication to maintenance system 190 to dispatch a technician to customer premises network 110 to install the additional WiFi AP 130. As another example, customer premises controller 120 may report that data usage for customer premises network 110 is exceeding a subscription service agreement and provisioning system 180 may contact the customer about upgrading the subscription.

Maintenance system 190 may include one or more devices, such as computer devices and/or server devices, which track and execute maintenance functions for customer premises network 110. For example, customer premises controller 120 may detect a malfunction for a particular WiFi AP 130 and may report the malfunction to maintenance system 190. Maintenance system 190 may schedule a maintenance ticket and may dispatch a technician to the customer premises location to service the malfunctioning WiFi AP 130.

Analysis system 192 may include one or more devices, such as computer devices and/or server devices, which may perform analysis functions for customer premises network 110. For example, analysis system 192 may perform cloud computing functions for customer premises controller 120, such as performing service requirements management calculations for customer premises controller 120, performing load balancing calculations for customer premises controller 120, performing channel interference calculations for customer premises controller 120, and/or performing other types of cloud computing calculations for customer premises controller 120. Furthermore analysis system 192 may keep tracks of trends associated with customer premises network 110, such as data usage trends for client devices 140 and/or WiFi APs 130 and may provide recommendations to customer premises controller 120 based on the trends.

Logging system 194 may include one or more devices, such as computer devices and/or server devices, which log data associated with customer premises network 110. For example, logging system 194 may log key performance indicators (KPI) data for customer premises network 110, may log data associated with customer premises controller 120, may monitor the health and/or performance of customer premises controller 120 and/or WAN interface device 150, may log data associated with subscribers associated with customer premises network 110 (e.g., customer service calls, etc.), and/or may log other types of data associated with customer premises network 110.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100. For example, in some implementations, some or all of the functionality of customer premises controller 120 may be implemented in SON system 170.

Figure 2:
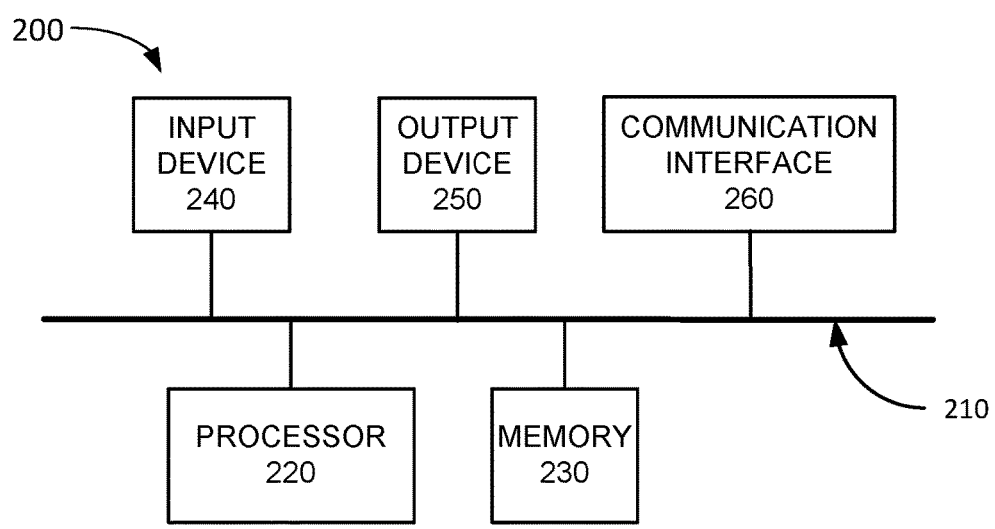
FIG. 2 is a diagram illustrating exemplary components of a device that may be included in a device or system of FIG. 1.

FIG. 2 is a diagram illustrating exemplary components of device 200 according to an implementation described herein. Customer premises controller 120, WiFi AP 130, client device 140, WAN interface device 150, SON system 170, provisioning system 180, and/or maintenance system 190 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals. If device 200 is included in WAN interface device 150, communication interface 260 may include one or more antenna assemblies.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to management of a customer premises network. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
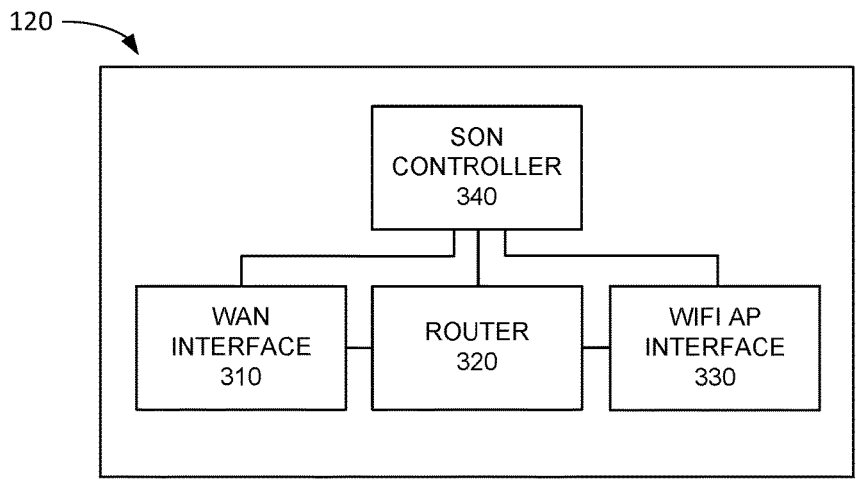
FIG. 3 is a diagram illustrating exemplary functional components of the customer premises controller of FIG. 1.

FIG. 3 is a diagram illustrating exemplary functional components of customer premises controller 120. The functional components of customer premises controller 120 may be implemented, for example, via processor 220 executing instructions from memory 230. Alternatively, some or all of the functional components included in customer premises controller 120 may be implemented via hard-wired circuitry. As shown in FIG. 3, customer premises controller 120 may include a WAN interface 310, a router 320, a WiFi AP interface 330, and a SON controller 340.

WAN interface 310 may establish communication with WAN interface device 150. For example, WAN interface 310 may establish a BNC connection with WAN interface device 150. Additionally or alternatively, WAN interface 310 may interface with provider network 160 via WAN interface device 150. For example, WAN interface 310 may perform gateway, firewall, and/or network address translation (NAT) functions for customer premises network 110. WAN interface 310 may perform packet encapsulation when sending packets to provider network 160 and may perform decapsulation when receiving packets from provider network 160. Furthermore, WAN interface 310 may authorize and/or authenticate customer premises controller 120 with provider network 160.

Router 320 may function as a switch and/or router for customer premises network 110. For example, router 320 may maintain a forwarding table and/or a routing table for client devices 140 and may forward packets received from provider network 160 to a particular WiFi AP 130 associated with a particular client device 140. Furthermore, router 320 may forward packets between client devices 140. If client device 140 is moved from a first WiFi AP 130 to a second WiFi AP 130, router 320 may update a forwarding table and/or routing table based on the change. WiFi AP interface 330 may interface with particular WiFi APs 130. For example, WiFi AP interface 330 may be configured to send and receive data units (e.g. Ethernet frames) with WiFi APs 130. SON controller 340 may control the operations of customer premises controller 120 and may perform SON functions to optimize the operation of customer premises network 110. Exemplary components of SON controller 340 are described below with reference to FIG. 4.

Although FIG. 3 shows exemplary components of customer premises controller 120, in other implementations, customer premises controller 120 may include fewer components, different components, additional components, or differently arranged components than depicted in FIG. 3. Additionally or alternatively, one or more components of customer premises controller 120 may perform one or more tasks described as being performed by one or more other components of customer premises controller 120.

Figure 4:
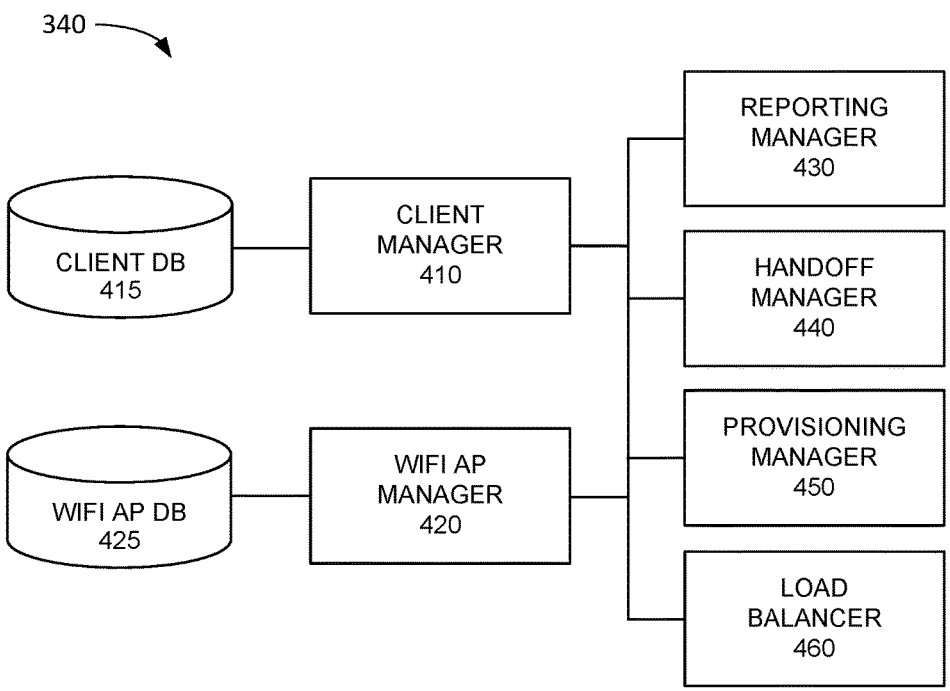
FIG. 4 is a diagram illustrating exemplary functional components of the self-organizing network controller of FIG. 3.

FIG. 4 is a diagram illustrating exemplary functional components of SON controller 340. The functional components of SON controller 340 may be implemented, for example, via processor 220 executing instructions from memory 230. Alternatively, some or all of the functional components included in SON controller 340 may be implemented via hard-wired circuitry. As shown in FIG. 4, SON controller 340 may include a client manager 410, a client database (DB) 415, a WiFi AP manager 420, a WiFi AP DB 425, a reporting manager 430, a handoff manager 440, a provisioning manager 450, and a load balancer 460.

Client manager 410 may manage client devices 140 based on information stored in client DB 415. Exemplary information that may be stored in client DB 415 is described below with reference to FIG. 5. For example, client manager 410 may manage one or more service requirements for each client device 140. For particular client devices 140, client manager 410 may define and/or change a particular service requirement. Client manager 410 may define, change, and/or monitor parameters such as throughput, QoS class, latency, error rate, signal quality, WiFi band, availability, and/or response time experienced by client device 140. Furthermore, client manager 410 may generate, maintain, and/or update a profile for client device 140 that includes information about service requirement parameters, and/or other parameters, experienced by client device 140 at particular times and may use the generated profile to predict future behavior for client device 140 to ensure service requirements for client device 140 are satisfied. Moreover, for particular client devices 140, such as, for example, client devices 140 associated with a "managed" classification, client manager 410 may monitor for malfunctions (e.g., by polling client devices 140 at particular intervals, based on receiving error messages from client devices 140, etc.).

WiFi AP manager 420 may manage WiFi APs 130 based on information stored in WiFi AP DB 425. Exemplary information that may be stored in WiFi DB 425 is described below with reference to FIG. 6. WiFi AP manager 420 may monitor parameters such as the capacity, processing load, and/or signal quality for each WiFi AP 130. Furthermore, WiFi AP manager 420 may monitor WiFi APs 130 for any malfunctions and may provide information relating to the malfunctions to reporting manager 430. Moreover, WiFi AP manager 420 may monitor for channel interference between WiFi APs 130 and may mitigate any channel interference by changing channels when channel interference is detected (e.g., a noise level above a threshold is detected) for a particular WiFi AP 130. Moreover, in some implementations, WiFi AP manager 420 may adjust a radiation pattern of a WiFi AP 130 to reduce channel interference. Furthermore, WiFi AP manager 420 may monitor for malfunctions of WiFi APs 130, by polling WiFi APs 130 at particular intervals, based receiving error messages from WiFi APs 130, and/or using another technique. Moreover, WiFi manager 420 may perform power management functions. For example, if a particular WiFi AP 130 is not associated with any active client devices 140, WiFi manager 420 may instruct the particular WiFi AP 130 to enter a power saving mode.

Reporting manager 430 may send reports and/or alerts to SON system 170, provisioning system 180, maintenance system 190, analysis system 192, and/or logging system 194. For example, reporting manager 430 may mirror data stored in client DB 415 and/or WiFi AP DB 425 to SON system 170. Moreover, reporting manager 430 may send an alert to provisioning system 180 that a provisioning change is to be made based on an indication received from provisioning manager 450 and/or may send an alert to maintenance system 190 that a particular WiFi AP 130 or a managed client device 140 needs maintenance based on an indication received from client manager 410 and/or WiFi AP manager 420. Furthermore, reporting manager 430 may log data associated with customer premises network 110 to logging system 194.

Handoff manager 440 may perform handoffs between different WiFi APs 130, between customer premises network 110 and a wireless access network, and/or between customer premises network 110 and another customer premises network 110. As an example, handoff manager 440 may handoff client device 140 from a first WiFi AP 130 to a second WiFi AP 130 based on determination made by client manager 410 and/or WiFi AP manager 420. As another example, handoff manager 440 may handoff client device 140 from a first customer premises network 110 to a second customer premises network 110 (e.g., when client device 110 moves from a first building to a second building). In some implementations, handoffs between customer premises networks 110 may be managed by SON system 170. In other implementations, handoffs between customer premises networks 110 may be handled by customer premises controllers 120 communicating with each other via peer connections established via WAN interface devices 150. As yet another example, handoff manager 440 may handoff client device 110 to a wireless access network in provider network 160 or vice versa.

Provisioning manager 450 may make provisioning recommendations for customer premises network 110 to provisioning system 180. For example, provisioning manager 450 may recommend to remove a particular WiFi AP 130 from customer premises network 110 due to insufficient use, may recommend changing a location of a particular WiFi AP 130 based on usage patterns associated with client devices 140, may recommend that an additional WiFi AP 130 be provisioned for customer premises network 110 when the capacity of customer premises network 110 is being exceeded at a particular amount and/or frequency, and/or may other types of provisioning recommendations.

Load balancer 460 may perform load balancing for customer premises network 110. As an example, load balancer 460 may determine that a first WiFi AP 130 is overloaded with data traffic and may determine that one or more client devices 140 should be moved to another WiFi AP 130. Thus, WiFi AP manager 420 may transfer a client device 140 from a first WiFi AP 130 to a second WiFi AP 130 in order to balance the load between the first WiFi AP 130 and the second WiFi AP 130 based on a load balancing calculation performed by load balancer 460. As another example, load balancer 460 may determine that a particular WiFi band (e.g., a 5 GHz band, a 2.4 GHz band, etc.) is overloaded and may move one or more client devices 140 connected to WiFi AP 130 via a first WiFi band to another WiFi band. Moreover, load balancer 460 may perform load balancing in response to a detected malfunction. For example, a first WiFi AP 130 may experience a malfunction and load balancer 460 may Although FIG. 4 shows exemplary components of SON controller 340, in other implementations, SON controller 340 may include fewer components, different components, additional components, or differently arranged components than depicted in FIG. 4. Additionally or alternatively, one or more components of SON controller 340 may perform one or more tasks described as being performed by one or more other components of SON controller 340. For example, SON controller 340 may use analysis system 192 to perform cloud computing processing in performing some or all of its functions. Furthermore, in some implementations, some or all of the functional components of SON controller 340 shown in FIG. 4 may be implemented in one or more other devices of system 100, such as, for example, WAN interface device 150 and/or SON system 170.

Figure 5:
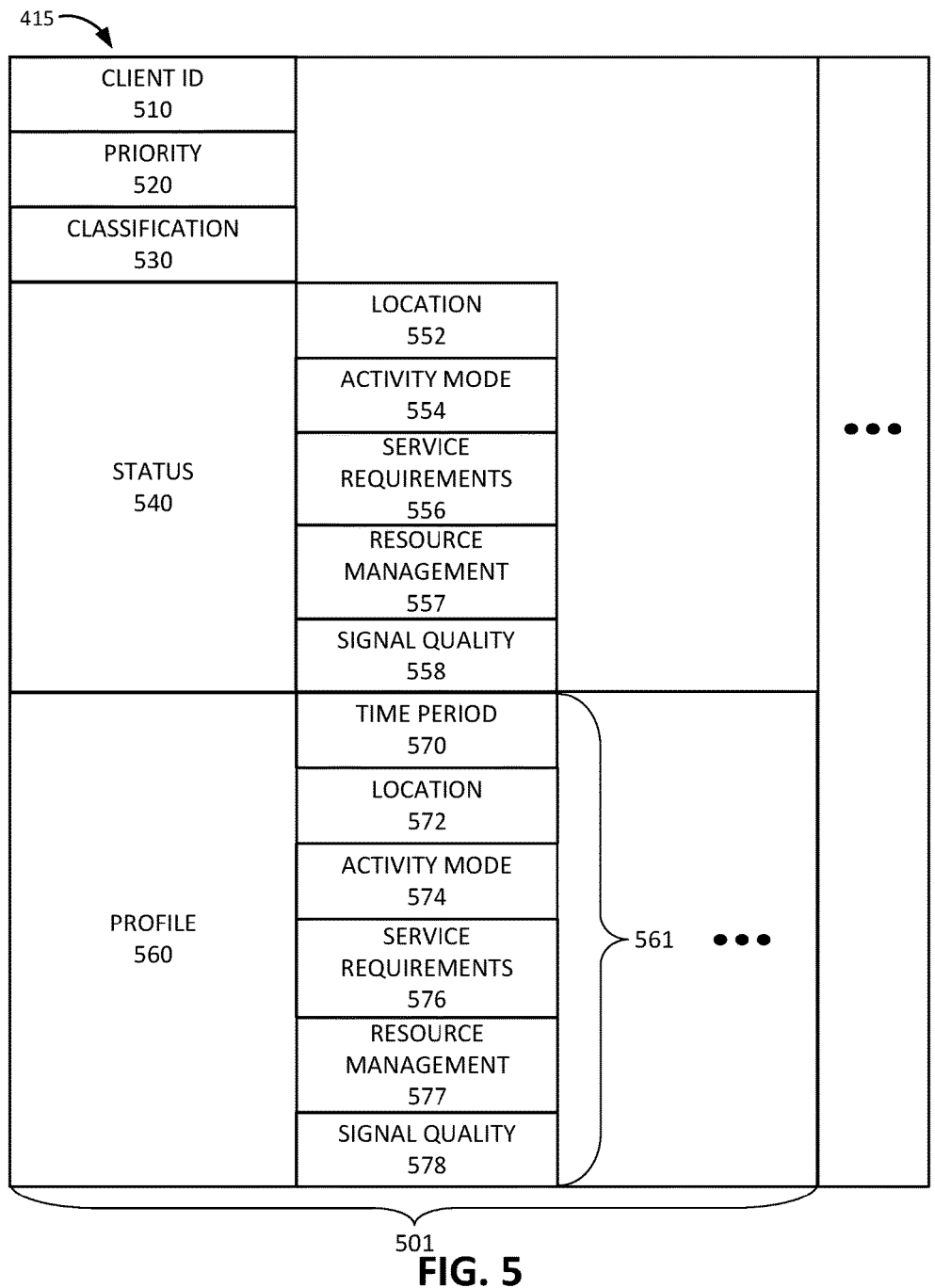
FIG. 5 is a diagram illustrating exemplary components of the client database of FIG. 4.

FIG. 5 is a diagram illustrating exemplary components of client DB 415. As shown in FIG. 5, client DB 415 may include one or more client records 501. A client record 501 may store information relating to a particular client device 140 associated with customer premises network 110. Any personally identifiable information (PII) stored in client DB 415 may be stored as encrypted data. Client record 501 may include a client identifier (ID) field 510, a priority field 520, a classification field 530, a status field 540, and a profile field 560.

Client ID field 510 may store one or more IDs associated with the particular client device 140, such as a Media Access Control (MAC) address, an Internet Protocol (IP) address, a Session Initiation Protocol (SIP) address; an associated subscriber telephone number, such as a Mobile Station International Subscriber Directory Number (MSISDN), an International Mobile Subscriber Identity (IMSI) number, a Mobile Directory Number (MDN); and/or by another type of device identifier.

Priority field 520 may store information identifying a priority associated with the particular client device 140. As an example, the priority may include a critical priority for devices that require constant connectivity and monitoring, such as medical or security devices; a high priority for devices associated with essential services, such as a thermostat, door lock, alarm system, carbon monoxide sensor, and/or smoke detector, or devices running a high priority application, such as a downstream video streaming application, an upstream video application (e.g., a security camera), a Voice over IP (VoIP) application, etc.; a medium priority for devices that will cause an inconvenience to a user if a connection is lost or experiences high latency, such as lighting devices, climate control devices, devices running a digital assistant application; a low priority for devices that may not affect a user or the environment if connectivity is lost, such as best effort traffic devices; and/or other types of priority values. The assigned priority may be used to determine which client device 140 to move when moving client device 140 to another WiFi AP 130 and/or which client device 140 to throttle when reducing a data rate. Different priority levels may be assigned to client device 140 for different times of day. For example, an MTC device may be assigned a high priority during the hour from 4 am to 5 am to ensure the MTC device is able to communicate with a server while other client devices 140 are less likely to be active.

Classification field 530 may include information identifying a classification associated with the particular client device 140. The classification information may identify a relationship of client device 140 with customer premises network 110 and/or provider network 160. As an example, a "managed" classification may indicate that client device 140 corresponds to a device that is managed by the provider associated with customer premises controller 120, such as a set-top box, one or more home security devices, etc. Managed client devices 140 may be assigned a higher priority than non-managed client devices 140. As another example, a "protocol" classification may indicate that client device 140 supports standards such as the 802.11k, 802.11r, and/or 802.11v standards, which enable client device 140 to perform functions such as moving from a first WiFi AP 130 to a second WiFi AP 130. As yet another example, an "unmanaged" classification may indicate that client device 140 may not support particular functions, such as being able to move from a first WiFi AP 130 to a second WiFi AP 130. As yet another example, a "guest" classification may indicate that client device 140 has been granted temporary access to customer services network 110. Guest client devices 140 may be assigned a lower priority than non-guest client devices 140. As yet another example, a "blacklist" classification may indicate that client device 140 should never be moved to another WiFi AP 130. For example, a stationary video client, such as a set-top box, may be blacklisted and thus never moved to another WiFi AP 130. A device may have more than one classification (e.g., managed and blacklist, etc.). The classification information may be used to determine what types of SON actions may be performed with respect to client device 140.

Status field 540 may store information relating to a current (and/or most recently determined) status of the particular client device 140. Status field 540 may include a location field 552, an activity mode field 554, a service requirements field 556, a resource management field 557, and a signal quality field 558.

Location field 552 may indicate a current location of client device 140. The current location may be determined based on information received via GPS receiver located in client device 140. Additionally or alternatively, location information may be determined based on trilateration of WiFi signal strengths from different WiFi APs 130. The location information may be used, for example, as a parameter in determining to which WiFi AP 130 client device 140 should connect.

Activity mode field 554 may indicate a current activity mode for client device 140. For example, activity mode may indicate a powered down mode, an idle mode, an active mode, and/or another type of mode. The activity mode may be used, for example, as a parameter in determining to which WiFi AP 130 client device 140 should connect.

Service requirements status 556 may include information identifying the current service requirements associated with client device 140. The current service requirements may be based on the current services associated with client device 140 (e.g., application, processes, functions, etc.). As an example, client device 140 may be running a video streaming application, which may be associated with a particular set of service requirements (e.g., latency, etc.). As another example, client device 140 may be idle and be associated with a best effort service requirement. The service requirements may include a QoS class requirement, a throughput requirement, a minimum data rate required for service, a latency requirement, an airtime availability requirement, an application service requirement, a signal strength requirement, a band requirement, a response time requirement, and/or another type of service requirement.

Resource management field 557 may store information relating to the management of resources associated with client device 140. For example, resource management field 557 may store information relating to air time use of client device 140 for particular WiFi channels, bandwidth capacity for client device 140, memory capacity for client device 140, processing capacity for client device 140, a particular mode of client device 140 (e.g., active mode, idle mode, power saving mode, etc.) and/or other types of resource management information. The capacity information may include a total available capacity as well as available capacity. Furthermore, resource management field 557 may store information relating to the health of client device 140, such as a detected malfunction, reported errors, percentage of down time client device 140 experienced in a time period, the number of soft and/or hard resets client device 140 performed during the time period, the number of security alerts client device 140 experienced during the time period, etc.

Signal quality field 558 may indicate a current signal quality experienced by client device 140 for signals received from one or more WiFi APs 130. The signal quality may be used, for example, as a parameter in determining to which WiFi AP 130 client device 140 should connect. The signal quality may include a Received Signal Strength Indication (RSSI) value and/or another signal strength value, a Signal-to-Interference-plus-Noise Ratio (SINR) value, a noise floor value, and/or another noise level value, a Packet Delivery Ratio (PDR) value or another and/or another packet loss value, a Bit Error Rate (BER) value and/or another error rate value, a Modulation and Coding Scheme (MCS) index value, a jitter value, and/or another type of signal quality metric value.

Profile field 560 may include a profile generated for the particular client device 140. Profile field 560 may include one or more profile entries 561. Each profile entry 561 may store information relating to information collected for the particular client device 140 during a particular time period. Profile entry 561 may include a time period field 570, a location field 572, an activity mode field 574, a service requirements field 576, a resource management field 577, and a signal quality field 578.

Time period field 570 may identify a particular time period during which the information for client device 140 was collected. A time period may correspond to a particular time of day, a particular day of the week, a particular range of dates, and/or another type of time period. Furthermore, time period field 570 may include a relevance value configured to decay over time. The relevance value may give more weight to recent time period. Thus, if the behavior of client device 140 changes over time, more recent behavior may be given a higher weight than behavior that occurred further in the past.

Location field 572 may store the location information for client device 140 during the particular time period. Furthermore, location field 572 may include information relating to the roaming history of the particular client device 140, such as what WiFi APs 130 the particular client device 140 was connected to during the particular time period. Activity mode field 574 may store information identifying the activity mode of client device 140 during the particular time period. Service requirements field 576 may store information identifying the service requirements for client device 140 during the particular time period. Resource management field 577 may store information relating to the management of resources associated with client device 140 during the particular time period. Signal quality field 578 may store information identifying signal quality information for client device 140 during the particular time period.

Although FIG. 5 shows exemplary components of client DB 415, in other implementations, client DB 415 may store fewer components, different components, additional components, or differently arranged components than depicted in FIG. 5.

Figure 6:
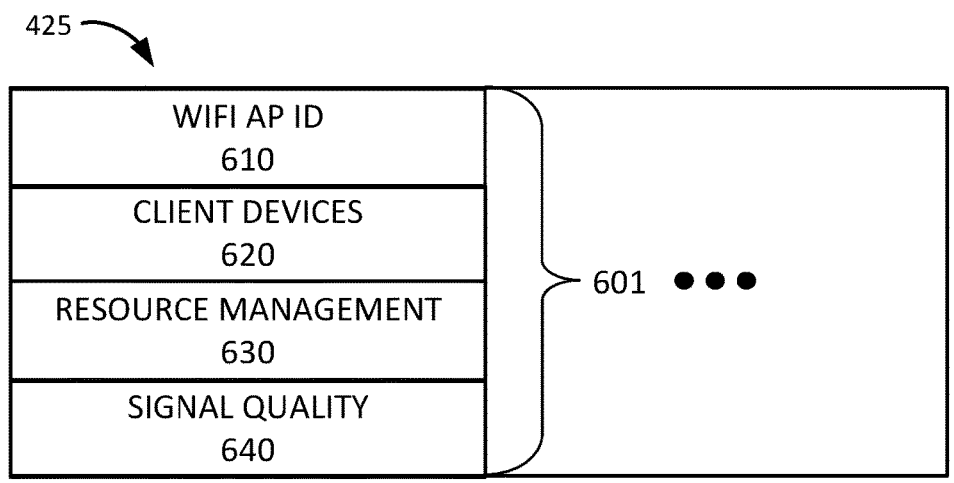
FIG. 6 is a diagram illustrating exemplary components of the WiFi access point database of FIG. 4.

FIG. 6 is a diagram illustrating exemplary components of the WiFi AP DB 425. As shown in FIG. 6, WiFi AP DB 425 may include one or more WiFi AP records 601. WiFi record 601 may store information relating to a particular WiFi AP 130 in customer premises network 110. WiFi record 601 may include a WiFi AP ID field 610, a client devices field 620, a resource management field 630, and a signal quality field 640.

WiFi AP ID field 610 may store one or more IDs associated with the particular WiFi AP 130, such as a Media Access Control (MAC) address, an IP address, an address associated with customer premises network 110 and assigned to the particular WiFi AP 130 by customer premises controller 120 (e.g., basic service set ID (BSSID)) or by provider network 160, and/or by another type of device identifier.

Client devices field 620 may store a list of client device 140 connected to the particular WiFi AP 130. Furthermore, client devices field 620 may include information relating to the history of which client devices 140 were attached to the particular WiFi AP 130 during previous time periods. Resource management field 630 may store information relating to resource management associated with the particular WiFi AP 130, such as air time allocation for client devices 140 connected to the particular WiFi AP 130, channel occupancy data for particular channels associated with the particular WiFi AP 130, air time data for client devices 140 connected to the particular WiFi AP 130, bandwidth capacity for the particular WiFi AP 130, memory capacity for the particular WiFi AP 130, processing capacity for the particular WiFi AP 130, and/or other types of resource management information. The capacity information may include a total available capacity as well as available capacity. Furthermore, resource management field 630 may store information relating to the historical resource management of the particular WiFi AP 130 during previous time periods.

Moreover, resource management field 630 may store information relating to the health of WiFi AP 130, such as a detected malfunction, reported errors, percentage of down time WiFi AP 130 experienced in a time period, the number of soft and/or hard resets WiFi AP 130 performed during the time period, the number of security alerts WiFi AP 130 experienced during the time period, the number of connection errors WiFi AP 130 experienced during the time period, etc.

Signal quality field 640 may store information relating to one or more signal quality metrics associated with the particular WiFi AP 130. For example, signal quality field 640 may store, for particular WiFi channels, an RSSI value and/or another signal strength value, a SINR value, a noise floor value, and/or another noise level value, a PDR value or another and/or another packet loss value, a BER value and/or another error rate value, a MCS index value, a jitter value, and/or another type of signal quality metric value. Furthermore, signal quality field 640 may store information relating to the historical signal quality for the particular WiFi AP 130 during previous time periods. The signal quality field 640 may store signal quality information for particular client devices 140 connected to WiFi AP 130 and the signal quality information for the particular client devices 140 may be copied to signal quality fields 558 and/or 578 of client device records 501 of the particular client devices 140.

Although FIG. 6 shows exemplary components of WiFi AP DB 425, in other implementations, WiFi AP DB 425 may store fewer components, different components, additional components, or differently arranged components than depicted in FIG. 6.

Figure 7:
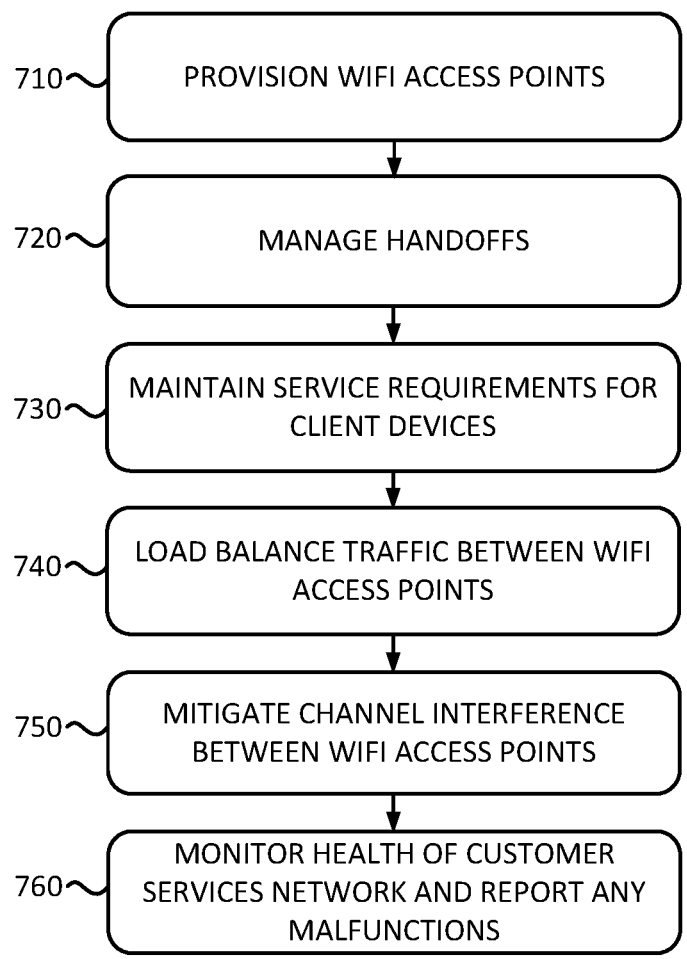
FIG. 7 is a flowchart of a process for managing a customer premises network according to an implementation described herein.

FIG. 7 is a flowchart of a process for managing a customer premises network according to an implementation described herein. In some implementations, the process of FIG. 7 may be performed by customer premises controller 120. In other implementations, some or all of the process of FIG. 7 may be performed by another device or a group of devices separate from customer premises controller 120.

The process of FIG. 7 may include provisioning WiFi APs 130 (block 710). For example, provisioning manager 450 may obtain information relating a subscription associated with customer premises network 110. The subscription information may include information identifying the number and location of WiFi APs 130, service requirements associated with particular client devices 140 (e.g., managed client devices 140), data limits associated with the connection from WAN interface device 150 to provider network 160, and/or other types of subscription information. Provisioning manager 450 may monitor the behavior of customer premises network 110 and may generate provisioning recommendations to provisioning system 160.

As an example, if allowed data limits are being exceeded (e.g., at a frequency higher than a data rate exceedance threshold), provisioning manager 450 may recommend that the data rate limit be increased. As another example if a particular WiFi AP 130 is experiencing low available capacity (e.g., less than a low capacity threshold), or if a particular WiFi AP 130 is experiencing poor signal quality (e.g., less than a signal quality threshold), provisioning manager 450 may recommend that an additional WiFi AP 130 be provisioned. As yet another example, if a first WiFi AP 130 is experiencing low use (e.g., a number of client devices 140 lower than a first client device threshold, a data use rate lower than a first data use rate threshold, etc.) and a second WiFi AP 130 is experiencing high use (e.g., a number of client devices 140 higher than a second client device threshold, a data use rate higher than a second data use rate threshold, etc.), provisioning manager 450 may recommend that the first WiFi AP 130 be moved into the vicinity (e.g., within a particular distance) of the second WiFi AP 130.

Handoffs may be managed (block 720). For example, handoff manager 440 may manage handoffs of client devices 140 between WiFi APs 130, between customer premises networks 110, and/or between customer premises network 110 and a wireless access network associated with provider network 160. A handoff may be performed by transferring one or more active sessions associated with client device 140 to a particular WiFi AP 130. For example, if client device 140 is receiving streaming video, handoff manager 440 may change the destination WiFi AP 130 in a forwarding table of router 320 for the streaming video session.

As another example, if client device 140 is connected to a wireless access network has an active VoIP telephone call session and connects to one of WiFi APs 130 upon arriving at the customer premises location, client manager 410 may inform handoff manager 440 that client device 140 is connected and handoff manager 440 may query SON system 170 for active sessions. SON system 170 may, in response, handoff the VoIP session to customer premises network 110 and handoff manager 440 may instruct router 320 to forward the VoIP session from WAN interface device 150 to the particular WiFi AP 130 to which client device 140 connected. Similarly, if client device 140 moves away from customer premises network 110, handoff manager 440 may detect that client device 140 is moving away based on the location of client device 140 and/or based on a signal quality dropping at a particular rate. Additionally or alternatively, client device 140 may be configured to send an alert to handoff manager 440 if client device 140 moves away and experiences a drop in signal quality.

In response, handoff manager 440 may send an indication to SON system 170 that client device 140 is moving away from customer premises network 110 and SON system 170 may handoff the VoIP session from WAN interface device 150 to a nearby base station. As yet another example, handoffs between customer premises networks 110 may be performed by SON system 170 by communicating with handoff managers 440 of different customer premises networks 110.

Furthermore, handoff manager 440 may handoff client devices 140 to a base station (or to another base station, when WAN interface device 150 is connected to provider network 160 via a base station) if the link between WAN interface device 150 and provider network 160 fails. In the event of such a failure, handoff manager 440 may perform such handoffs based on the priority and/or classification of client devices 140. For example, critical client devices 140 may be handed off first, followed by high priority client devices 140 and/or managed client devices 140, etc.

Service requirements for client devices 140 may be managed (block 730). A process for managing service requirements of client devices 140 is described below with reference to FIG. 8.

Traffic between WiFi APs 130 may be load balanced (block 740). For example, load balancer 460 may determine an available capacity for particular WiFi APs 130 and may distribute client devices 140 to balance out the available capacity, while maintaining signal quality and service requirements for client devices 140. For example, each WiFi AP 130 may have a set available bandwidth and airtime (i.e., the amount of bandwidth) for each client device 140 connected to WiFi AP 130 may be measured as a percentage. For example, client device 140 with 0% of the airtime for WiFi AP 130 may not be able to receive or transmit any data. The airtime for client device 140 may be based on the service requirements of client device 140.

The airtime percentage may be computed as the ratio of the service requirement throughput, divided by the WiFi AP 130 throughput, and multiplied by 100%. For example, if client device 140 is streaming high definition video, client device 140 may require a throughput of 5 Megabits per second (Mbps) for successful streaming. If the maximum throughput of WiFi AP 130 is 500 Mbps, client device 140 may be allocated (5 Mbps)/(500 Mbps)×100%=1% of the available airtime for WiFi AP 130. Thus, if a first WiFi AP 130 is experiencing 10% available airtime capacity and a second WiFi AP 130 is experiencing 80% available airtime capacity, one or more of client devices 140 connected to the first WiFi AP 130 may be transferred to the second WiFi AP 130.

Channel interference between WiFi APs 130 may be mitigated (block 750). The channel interference mitigation may be performed for two or more WiFi APs 130 in customer services network 110 or between WiFi APs 130 of neighboring customer premises networks 110. For example, WiFi AP manager 420 may detect a drop in signal quality for a particular WiFi AP 130 after a new WiFi AP 130 is installed, after a channel change on another WiFi AP 130, and/or based on detecting signals from a foreign WiFi AP 130 that is not part of customer premises network 110 (e.g., a WiFi AP 130 in a neighboring customer premises network 110). In response, WiFi AP manager 420 may switch the particular WiFi AP 130 to a different channel. If the channel causing the interference is known, WiFi AP manager 420 may select a non-overlapping channel. Furthermore, in some implementations, SON system 170 may manage channel interference between nearby customer premises networks 110. If SON system 170 determines that channels of WiFi APs 130 from nearby customer premises networks 110 are interfering with each other, SON system 170 may instruct one of the associated customer premises controllers 110 to instruct one of the WiFi APs 130 to change to a different channel.

Health of customer services network 110 may be monitored and any malfunctions may be reported (block 760). For example, reporting manager 430 may monitor WiFi APs 130, and/or managed client devices 140, for error messages or unresponsiveness. If an error or a nonresponsive device is detected, reporting manager 430 may send a malfunction alert to maintenance system 190 and maintenance system 190 may dispatch a technician to address the malfunction. Furthermore, if a particular WiFi AP 130 fails, reporting manager 430 may alert handoff manager 440 and handoff manager 440 may transfer client devices 140 from the failed WiFi AP 130 to another WiFi AP 130.

Figure 8:
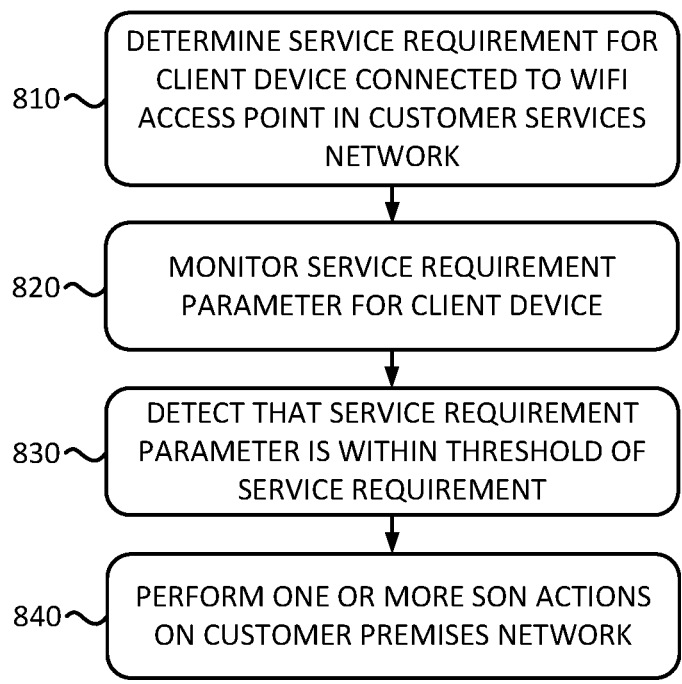
FIG. 8 is a flowchart of a process for maintaining a service requirement for a client device according to an implementation described herein.

FIG. 8 is a flowchart of a process for maintaining a service requirement for a client device according to an implementation described herein. In some implementations, the process of FIG. 8 may be performed by customer premises controller 120. In other implementations, some or all of the process of FIG. 8 may be performed by another device or a group of devices separate from customer premises controller 120.

The process of FIG. 8 may include determining a service requirement for client device 140 connected to WiFi AP 130 in customer premises network 110 (block 810). For example client manager 410 may determine active application sessions and/or other types of processes for client device 140 and may determine the service requirements for particular application sessions and/or processes. The service requirements may include a QoS class requirement, a throughput requirement, a minimum data rate requirement, a latency requirement, an airtime availability requirement, an application service requirement (e.g., a VoIP application, a video streaming application, a gaming application, a health monitoring application, a security application etc.), a signal strength requirement (e.g., an RSSI requirement), a band requirement (e.g., a requirement to use a 5 GHz band, a requirement to use a 2.4 GHz band, etc.), a response time requirement, and/or another type of service requirement. Furthermore, client manager 410 may define and/or change one or more service requirements for one or more client devices 140. For example, client manager 410 may define a band requirement (e.g., a 5 GHz band) for a managed client device 140, such as a set-top box or media access device.

A service requirement parameter may be monitored for the client device (block 820). For example, client manager 410 may measure one or more service requirement parameters associated with the determined service requirements, such as a throughput value for client device 140, a minimum data rate value for client device 140 over a specified time period, a latency value for client device 140, a response time value for client device 140, an availability value for client device 140, a packet loss value for client device 140, a signal quality value for client device 140 (e.g., a signal strength value, a noise level value, an error rate value, etc.). The monitored service requirement parameters may be compared to the determined service requirement.

A detection may be made that a service requirement parameter is within a threshold of the service requirement (block 830). For example, client device 410 may assign a service requirement trigger level for the service requirement, such as a bound that must be maintained in order for the service requirement to not be in danger of being violated. As an example, if the minimum required throughput for a streaming video application is 5 Mbps, a bound of 6 Mbps may be set as the trigger level at which a SON action is triggered.

One or more SON actions may be performed on the customer premises network 110 in response to the detection (block 840). For example, SON controller 340 may throttle a throughput of another client device 140 connected via customer premises network 110 (e.g., connected to the same WiFi AP 130 or connected to a different WiFi AP 130), move another client device 140 from a first WiFi AP 130 to a second WiFi AP 130, move client device 140 to another WiFi AP 130, move client device 140, or another client device 140, to a different band of WiFi AP 130, moving one or more WiFi APs 130 to a different channel, or mitigate channel interference between at least two WiFi APs 130.

The particular SON action that is selected may depend on the state of customer premises network 110. For example, if a nearby WiFi AP 130 has high available capacity, then an action of moving client device 140, or another client device 140 with a lower service requirement and/or a lower priority, may be selected. Thus, the decision may be based on the service requirements of other client devices 140, based on the priority and/or classification of client devices 140, based on the available capacity of WiFi APs 130, based on the signal quality associated with client devices 140, and/or based on other parameters associated with customer premises network 110.

Figure 9:
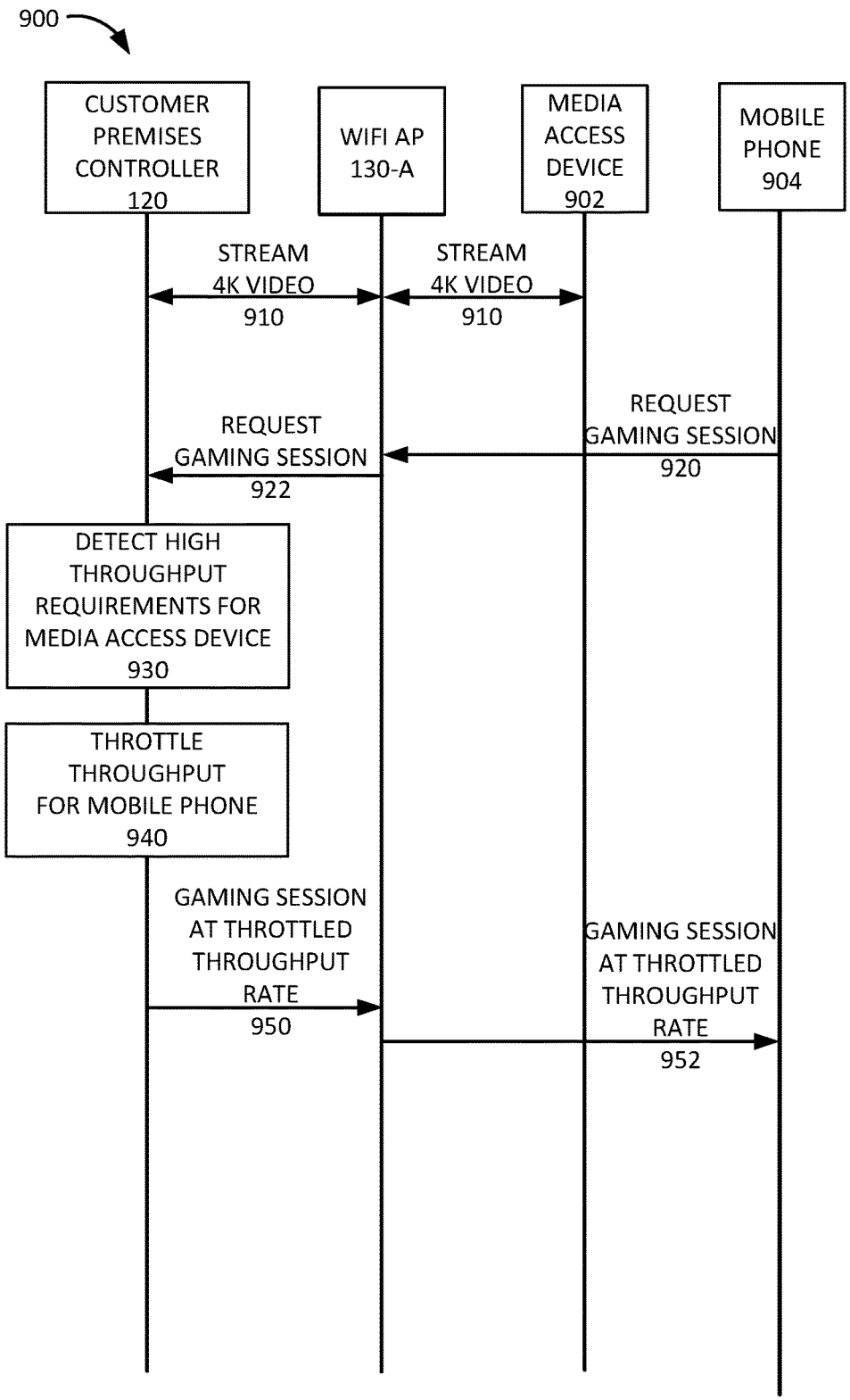
FIG. 9 is a diagram of a first exemplary signal flow diagram according to an implementation described herein.

FIG. 9 is a diagram of a first exemplary signal flow diagram 900 according to an implementation described herein. As shown in FIG. 9, signal flow 900 may be implemented in a system where client devices 140 include a media access device 902 (e.g., a set-top box) and a mobile phone 904. Signal flow 900 may include establishing a video streaming connection to stream 4K video from customer premises controller 120 to a media access device 902 via WiFi AP 130-A (signal 910). At a later time, a child user may use mobile phone 904 to start a gaming session for a real-time game via WiFi AP-130-B (signals 920 and 922).

Customer premises controller 120 may detect that the streaming video application on media access device 902 has high throughput requirements and may further determine that the gaming session throughput may reduce the capacity of WiFi AP 130-A to a level that may reduce the throughput of the streaming video below a throughput specified by the service requirement associated with the streaming application (block 930). Customer premises controller 120 may further determine that media access device 902 is associated with a high priority and that mobile phone 904 is associated with a low priority. Therefore, customer premises controller 120 may select to throttle the gaming session by limiting the throughput of the gaming session to a level that will ensure the required throughput of the streaming video application (block 940). In response, the gaming sessions may be established via a connection with a throttled throughput (signals 950 and 952).

Figure 10:
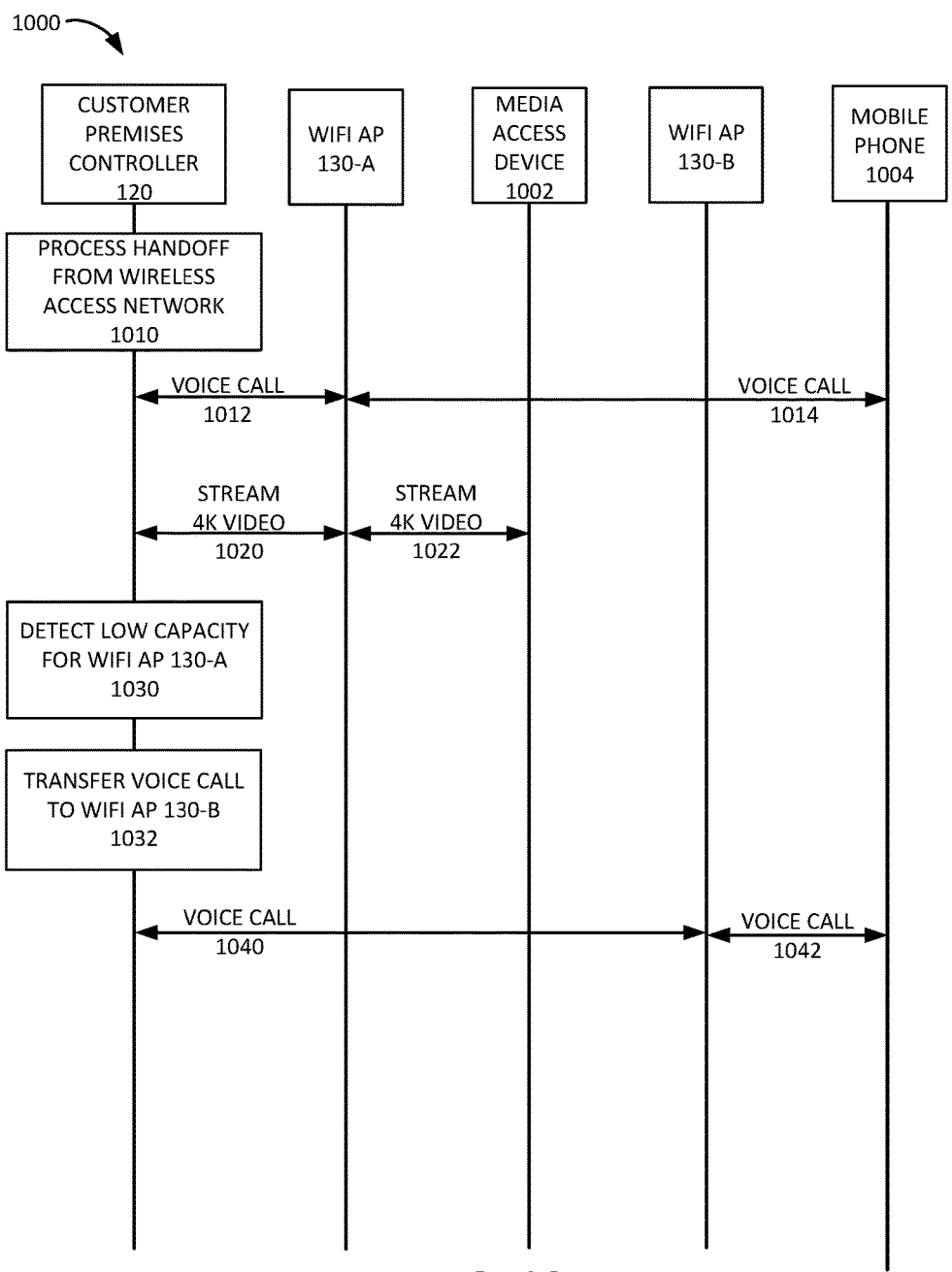
FIG. 10 is a diagram of a second exemplary signal flow diagram according to an implementation described herein.

FIG. 10 is a diagram of a second exemplary signal flow diagram 1000 according to an implementation described herein. As shown in FIG. 10, signal flow 1000 may be implemented in a system where client devices 140 include a media access device 1002 (e.g., a set-top box) and a mobile phone 1004. Signal flow 1000 may include processing a handoff from a wireless access network (block 1010). For example, customer premises controller 120 may receive an instruction from SON system 170 to establish a VoIP connection to mobile phone 1004. In response, customer premises controller 120 may establish a VoIP session with mobile phone 1004 via WiFi AP 130-A (signals 1012 and 1014). At a later time while the VoIP session is still active, media access device 1002 may activate a video streaming application to stream 4K video via WiFi AP 130-A (signals 1020 and 1022).

After the video streaming application is activated, customer premises controller 120 may determine that WiFi AP 130-A has a capacity that is lower than a capacity threshold (block 1030). Furthermore, customer premises controller 120 may determine that media access device 1002 is blacklisted from being moved and may therefore select to transfer the VoIP session in order to maintain the service requirements for the video streaming application (block 1032). In response, customer premises controller 120 may move the VoIP session from WiFi AP 130-A to WiFi AP 130-B (signals 1040 and 1042).

Figure 11:
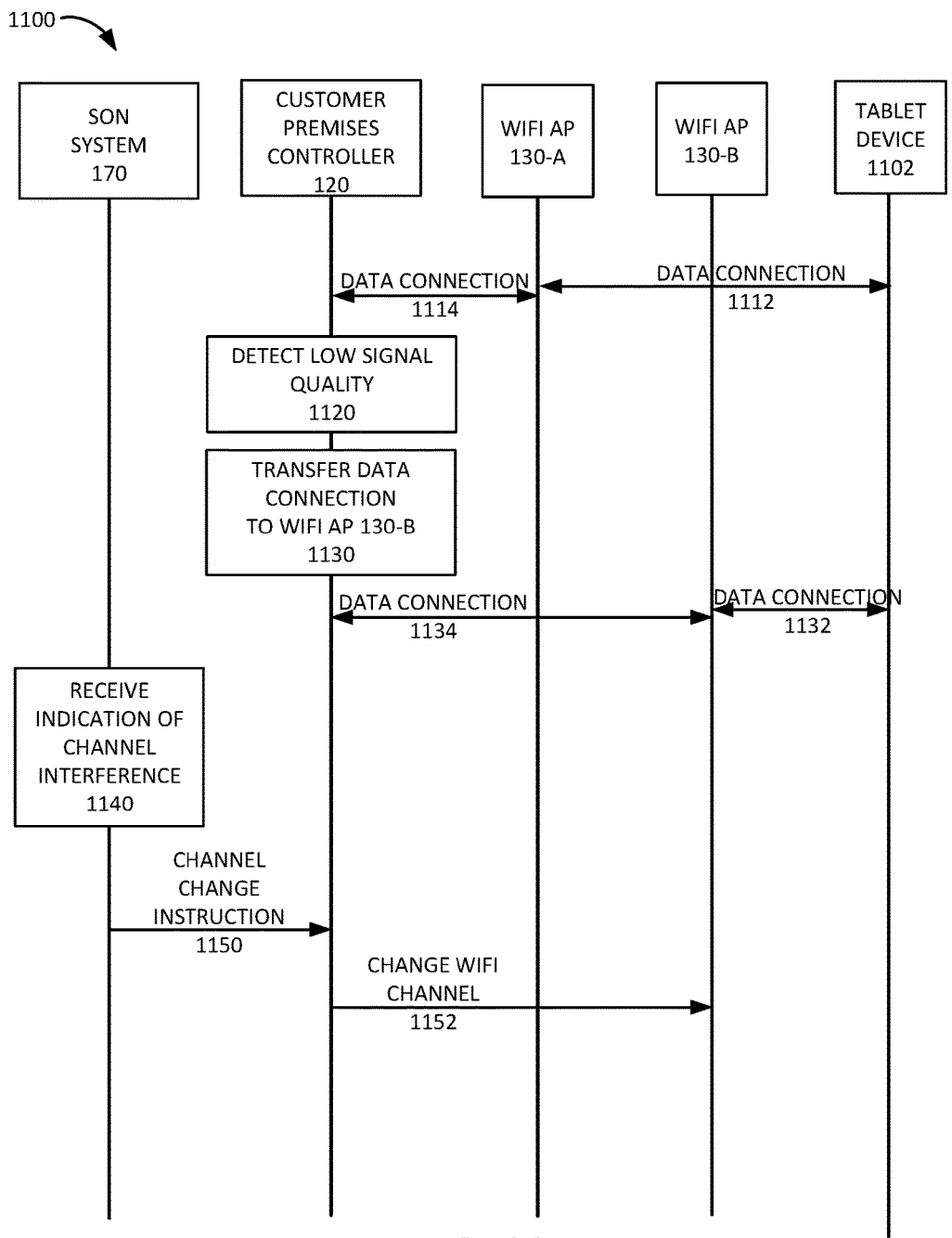
FIG. 11 is a diagram of a third exemplary signal flow diagram according to an implementation described herein.

FIG. 11 is a diagram of a third exemplary signal flow diagram 1100 according to an implementation described herein. As shown in FIG. 11, signal flow 1100 may be implemented in a system where client devices 140 include a tablet device 1102. Signal flow 1100 may include tablet device 1102 establishing a data connection via WiFi AP 130-A (signals 1112 and 1114). At a later time, customer premises controller 120 may detect a low signal quality associated with the connection between tablet device 1102 and WiFi AP 130-A (block 1120). Furthermore, tablet device 1102 may be reporting a higher quality signal from WiFi AP 130-B. In response, customer premises controller 120 may instruct tablet device 1102 to transfer to WiFi AP 130-B (block 1130) and the data connection may be established via WiFi AP 130-B (signals 1132 and 1134).

At a later time, SON system 170 may receive an indication from a neighboring customer premises network 110 that WiFi AP 130-B is causing channel interference to a neighboring WiFi AP 130 that is part of the neighboring customer premises network 110 (block 1140). SON system 170 may determine that the other WiFi AP 130 at the other customer premises network 110 cannot change its channel (e.g., because a large number of client devices 140 are connected to it) and may determine that WiFi AP 130-B should change channels. Thus, SON system 170 may send a channel change instruction to customer premises controller 120 for WiFi AP 130-B (signal 1150) and customer premises controller 120 may, in response, instruct WiFi AP 130-B to change the channel associated with the data connection (signal 1152). The WiFi AP 130-B may be instructed to change to a different channel in the same WiFi band or to change to a different channel in a different WiFi band.

Figure 12:
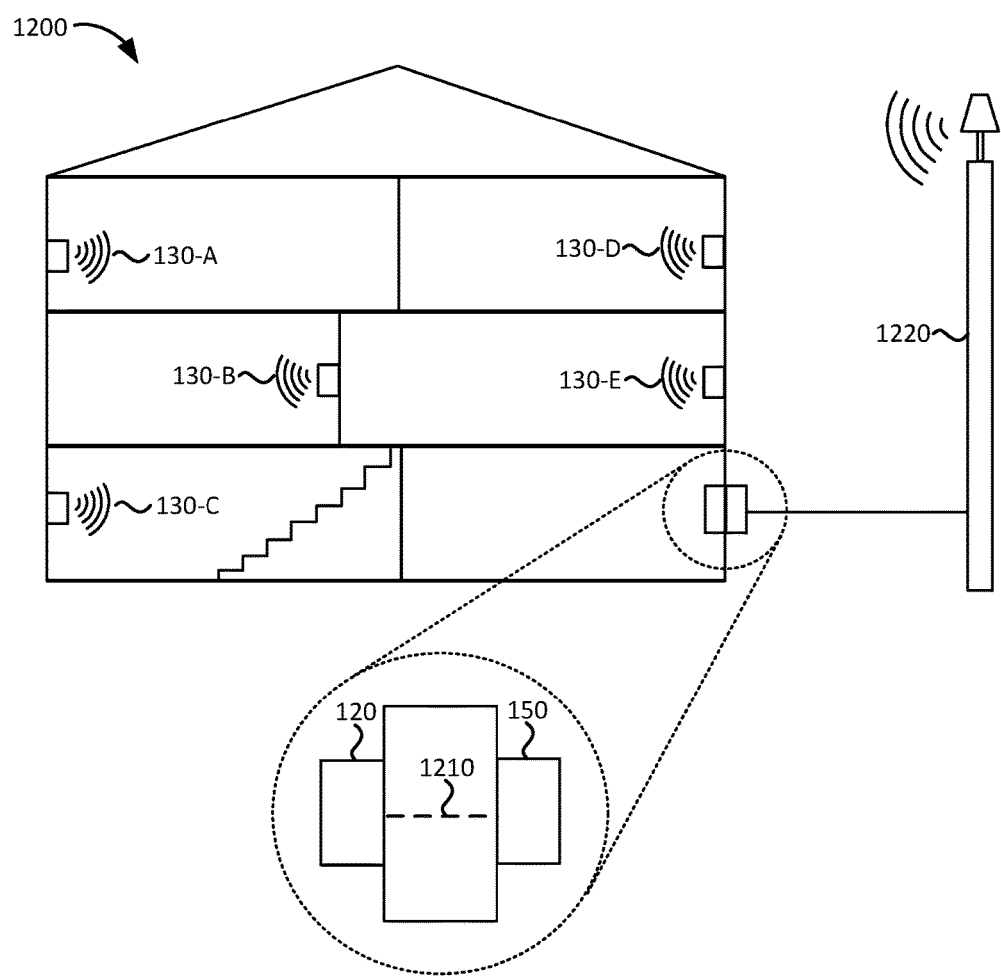
FIG. 12 is a diagram of a first exemplary system according to an implementation described herein.

FIG. 12 is a diagram of a first exemplary system 1200 according to an implementation described herein. A shown in FIG. 12, system 1200 may include a single family residence with five WiFi APs 130: WiFi AP 130-A, WiFi AP 130-B, WiFi AP 130-C, WiFi AP 130-D, and WiFi AP 130-E. Each of the five WiFi APs 130 may be located in a different room of the residence to ensure full coverage inside the residence. Customer premises controller 120 may be installed on the inside of an exterior wall with WAN interface device 150 installed on the outside of the exterior wall. Customer premises controller 120 and WAN interface device 150 communicate via a wireless BNC connection 1210 through the wall. WAN interface device 150 may be connected to a wireless transceiver and antenna assembly 1220 mounted on a pole and configured to communicate with a 5G base station.

Figure 13:
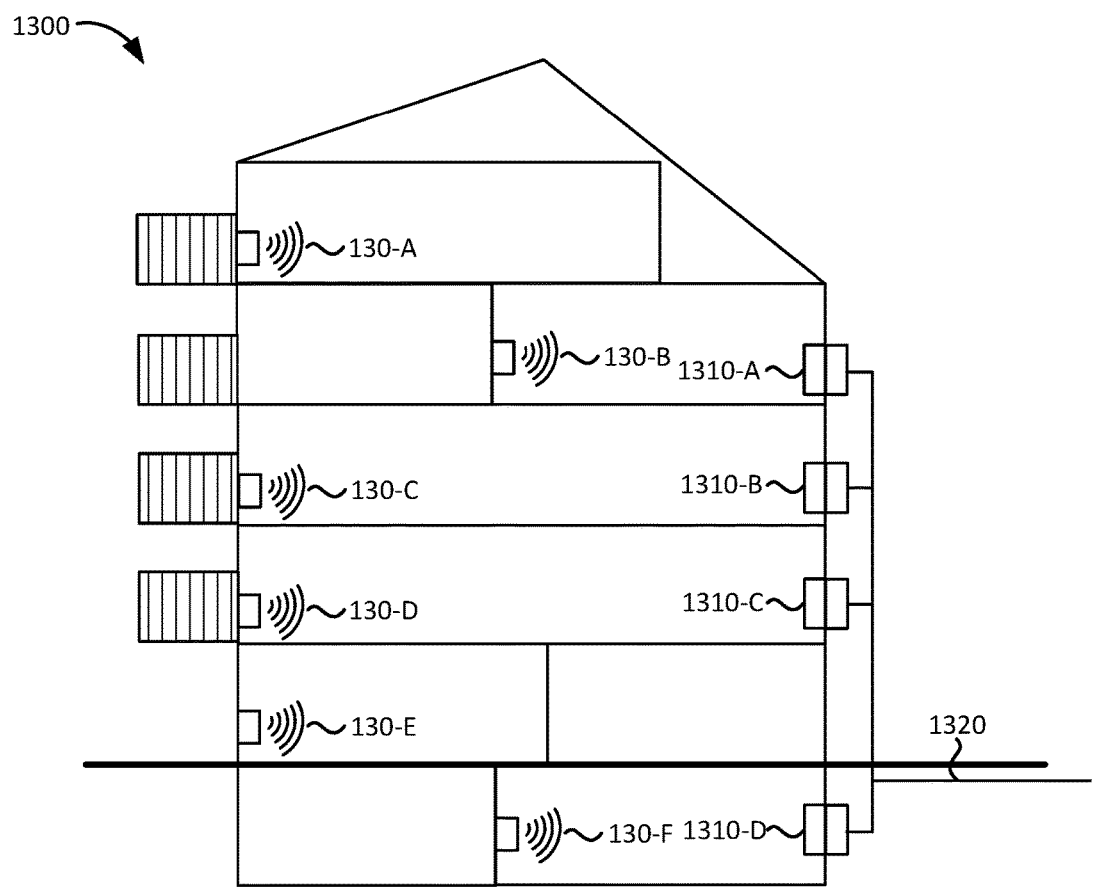
FIG. 13 is a diagram of a second exemplary system according to an implementation described herein.

FIG. 13 is a diagram of a second exemplary system 1300 according to an implementation described herein. In system 1300, WAN interface devices 150 may include optical connections to a GPON network that is part of provider network 160. A shown in FIG. 13, system 1300 may include an apartment building with eight apartments and six WiFi APs 130: WiFi AP 130-A, WiFi AP 130-B, WiFi AP 130-C, WiFi AP 130-D, WiFi AP 130-E, and WiFi AP 130-F. WiFi AP 130-A and 130-B may be connected via wired connections to assembly 1310-A, which includes customer premises controller 120 and WAN interface device 150 mounted similarly to as described in FIG. 12. WiFi AP 130-C may be connected via a wired connection to an assembly 1310-B that also includes customer premises controller 120 and WAN interface device 150. WiFi AP 130-D and WiFi AP 130-E may be connected via wired connections to an assembly 1310-C that also includes customer premises controller 120 and WAN interface device 150. WiFi AP 130-F may be connected via a wired connection to an assembly 1310-D that also includes customer premises controller 120 and WAN interface device 150. Assemblies 1310-A, 1310-B, 1310-C, and 1310-D may include optical network terminals connected to a GPON network, which is part of provider network 160, via an optical cable assembly 1320. As explained above, in other implementations, a different type of connection may be used from WAN interface device 150 to provider network 160, such as an Ethernet connection, a coaxial cable connection, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signal flows have been described with respect to FIGS. 9, 10, and 11, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining, by a computer device, an active application session on a client device connected to a WiFi access point in a customer premises network that includes a plurality of WiFi access points;
    determining, by the computer device, a service requirement associated with the determined active application session;
    monitoring, by the computer device, a service requirement parameter, associated with the determined service requirement, for the client device;
    detecting, by the computer device, that the service requirement parameter is within a threshold of the determined service requirement; and
    performing, by the computer device, a self-organizing network (SON) action on the customer premises network, in response to detecting that the service requirement parameter is within the threshold of the determined service requirement.

2. The method of claim 1, wherein the service requirement includes at least one of:
    a Quality of Service (QoS) class requirement,
    a throughput requirement,
    a minimum data rate,
    a latency requirement,
    an airtime availability requirement,
    an application service requirement,
    a signal strength requirement,
    a band requirement, or
    a response time requirement.

3. The method of claim 1, wherein detecting that the service requirement parameter is within the threshold of the determined service requirement includes:
    generating a profile for the client device, wherein the generated profile includes historical usage information for the client device; and
    predicting that the service requirement parameter will reach the threshold of the determined service requirement within a time period based on the generated profile.

4. The method of claim 1, wherein performing the SON action on the customer premises network includes at least one of:
    throttling a throughput of another client device connected via the customer premises network;
    moving another client device from a first one of the plurality of WiFi access points to a second one of plurality of WiFi access points,
    moving the client device to another one of the plurality of WiFi access points,
    moving the client device, or the other client device, to a different band of the WiFi access point,
    moving one or more of the plurality of WiFi access points to a different channel, or
    mitigating channel interference between at least two of the plurality of WiFi access points.

5. The method of claim 1, further comprising:
    detecting that the client device has moved a particular distance from the customer premises network; and
    handing off the client device from the customer premises network to a wireless access network, in response to detecting that the client device has moved the particular distance from the customer premises network.

6. The method of claim 1, further comprising:
    detecting that another client device, associated with the customer premises network, is attached to a wireless access network and has moved to within a particular distance of the customer premises network; and
    handing off the other client device from the wireless access network to the customer premises network, in response to detecting that the other client device is attached to the wireless access network and has moved to within the particular distance of the customer premises network.

7. The method of claim 1, further comprising:
    reporting one or more SON parameters, associated with the customer premises network, to a SON system associated with a wireless access network via a Wide Area Network (WAN) interface device.

8. The method of claim 1, further comprising:
    detecting that a signal strength associated with the client device is below a signal strength threshold; and
    moving the client device to another one of the plurality of WiFi access points, in response to detecting that the signal strength associated with the client device is below the signal strength threshold.

9. The method of claim 1, further comprising:
performing channel interference mitigation between at least one of the plurality of WiFi access points and a neighboring WiFi access point associated with a neighboring customer premises network.

10. The method of claim 1, further comprising:
performing load balancing of client device data traffic between a first one of the plurality of WiFi access points and a second one of the plurality of WiFi access points.

11. The method of claim 1, further comprising:
determining that an additional WiFi access point is to be provisioned for the customer premises network; and
alerting a provisioning system, in response to determining that the additional WiFi access point is to be provisioned for the customer premises network.

12. The method of claim 1, further comprising:
detecting a malfunction associated with at least one of the plurality of WiFi access points; and
alerting a maintenance system, in response to detecting the malfunction associated with the at least one of the plurality of WiFi access points.

13. A computer device comprising:
a memory configured to store instructions; and
a processor configured to execute the instructions to:
determine an active application session on a client device connected to a WiFi access point in a customer premises network that includes a plurality of WiFi access points;
determine a service requirement associated with the determined active application session;
monitor a service requirement parameter, associated with the determined service requirement, for the client device;
detect that the service requirement parameter is within a threshold of the determined service requirement; and
perform a self-organizing network (SON) action on the customer premises network, in response to detecting that the service requirement parameter is within the threshold of the determined service requirement.

14. The computer device of claim 13, wherein the service requirement includes at least one of:
a Quality of Service (QoS) class requirement,
a data rate requirement,
a latency requirement,
an application service requirement,
a signal strength requirement, or
a band requirement.

15. The computer device of claim 13, wherein, when performing the SON action on the customer premises network, the processor is configured to at least one of:
throttle a throughput of another client device connected via the customer premises network;
move another client device from a first one of the plurality of WiFi access points to a second one of plurality of WiFi access points,
move the client device to another one of the plurality of WiFi access points,
move the client device, or the other client device, to a different band of the WiFi access point,
move one or more of the plurality of WiFi access points to a different channel, or
mitigate channel interference between at least two of the plurality of WiFi access points.

16. The computer device of claim 13, wherein the processor is further configured to:
detect that the client device has moved a particular distance from the customer premises network; and
hand off the client device from the customer premises network to a wireless access network, in response to detecting that the client device has moved the particular distance from the customer premises network.

17. The computer device of claim 13, wherein the processor is further configured to:
detect that a signal strength associated with the client device is below a signal strength threshold; and
move the client device to another one of the plurality of WiFi devices, in response to detecting that the signal strength associated with the client device is below the signal strength threshold.

18. The computer device of claim 13, wherein the processor is further configured to at least one of:
perform channel interference mitigation between at least one of the plurality of WiFi access points and a neighboring WiFi access point associated with a neighboring customer premises network; or
perform load balancing of client device data traffic between a first one of the plurality of WiFi access points and a second one of the plurality of WiFi access points.

19. The computer device of claim 13, wherein the processor is further configured to:
send an alert via a Wide Area Network (WAN) interface device, in response to detecting at least one of that that an additional WiFi access point is to be provisioned for the customer premises network or detecting a malfunction associated with the at least one of the plurality of WiFi access points.

20. A system comprising:
a plurality of WiFi access points in a customer premises network; and
a controller device configured to:
determine an active application session on a client device connected to a WiFi access point, of the plurality of WiFi access points, in the customer premises network;
determine a service requirement associated with the determined active application session;
monitor a service requirement parameter, associated with the determined service requirement, for the client device;
detect that the service requirement parameter is within a threshold of the determined service requirement; and
perform a self-organizing network (SON) action on the customer premises network, in response to detecting that the service requirement parameter is within the threshold of the determined service requirement.

* * * * *